(12) United States Patent
Biazetti et al.

(10) Patent No.: US 7,739,207 B2
(45) Date of Patent: Jun. 15, 2010

(54) NETWORK AUTONOMOUS LEARNING SYSTEM THAT ALLOWS COMPUTERS TO SHARE LEARNED KNOWLEDGE SUCH THAT ERRORS AND POTENTIAL PROBLEMS ARE IDENTIFIED AND RESOLVED

(75) Inventors: Ana Claudia Biazetti, Cary, NC (US); Fonda J. Daniels, Cary, NC (US); Timothy P. Winkler, Southbury, CT (US)

(73) Assignee: International Business Machines Corporation, Armonk, NY (US)

( * ) Notice: Subject to any disclaimer, the term of this patent is extended or adjusted under 35 U.S.C. 154(b) by 713 days.

(21) Appl. No.: 11/483,661

(22) Filed: Jul. 11, 2006

(65) Prior Publication Data
US 2008/0016017 A1    Jan. 17, 2008

(51) Int. Cl.
*G06F 15/18* (2006.01)
*G06N 3/08* (2006.01)

(52) U.S. Cl. .............................. 706/15; 714/26; 714/48

(58) Field of Classification Search ................... 706/15
See application file for complete search history.

(56) References Cited

U.S. PATENT DOCUMENTS

2004/0019637 A1    1/2004  Goodman et al.

OTHER PUBLICATIONS

Lesser et al., "Functionally Accurate, Cooperative Distributed Systems", 1981.*
Barbuceanu et al., "Capturing and Modeling Coordination Knowledge For Multi-Agent Systems", 1996.*
Tajibnapis, "A Correctness Proof of a Topology Information Maintenance Protocol for a Distributed Computer Network", 1977.*
Lesser et al., Functionally Accurate, Cooperative Distributed Systems, 1981.*
Tajibnapis, A Correctness Proof of a Topology Information Maintenance Protocol for a Distributed Computer Network, 1977.*
Barbuceanu et al., Capturing and Modeling Coordination Knowledge For Multi-Agent Systems, 1996.*

* cited by examiner

*Primary Examiner*—Donald Sparks
*Assistant Examiner*—Nathan H Brown, Jr.
(74) *Attorney, Agent, or Firm*—Cahn & Samuels LLP (57) ABSTRACT

Autonomic learning agent(s) that identify and analyze errors, problems and potential problems, deduces possible solutions from a set of known rules, communicates with other systems on the network for addition information regarding potential solutions, and performs repairs based on the solution information gathered. The system can be used for identifying network-related or inter-computer communication problems that could not otherwise be identified from a single agent system. An exemplary agent includes three (3) major components: a task manager which controls the monitoring of the system or network and triggers alerts when a problem or potential problem is identified; a reason engine which contains the Artificial Intelligence (AI) system used for deducing possible automatable solutions for an identified problem; and a messaging interface which handles communication between agents. The system also reduces the amount of time administrators would spend identifying system or network problems by automating the problem-solving process.

11 Claims, 5 Drawing Sheets

NETWORK AUTONOMOUS LEARNING SYSTEM THAT ALLOWS COMPUTERS TO SHARE LEARNED KNOWLEDGE SUCH THAT ERRORS AND POTENTIAL PROBLEMS ARE IDENTIFIED AND RESOLVED

I. COPYRIGHT NOTICE

A portion of the disclosure of this patent document contains material which is subject to copyright protection. The copyright owner has no objection to the facsimile reproduction by anyone of the Patent and Trademark Office patent file or records, but otherwise reserves all copyright rights whatsoever.

II. REFERENCE TO A COMPUTER PROGRAM LISTING APPENDIX SUBMITTED ON A COMPACT DISK

Computer program listings incorporated herein by reference are submitted herewith on one compact disk (Copy 1) and one duplicate compact disk (Copy 2) as follows:

Disk One of One:

| NAME: | SIZE: | CREATED ON: |
| --- | --- | --- |
| AICore.java | 3 KB | Jul. 18, 2005 |
| AICore.owl | 4 KB | Jul. 13, 2005 |
| AIXListener.java | 2 KB | Jun. 9, 2005 |
| DiskCleaner.java | 1 KB | Jul. 11, 2005 |
| DoubleHashtable.java | 2 KB | Jul. 20, 2005 |
| JMSTest.java | 3 KB | Jul. 14, 2005 |
| MessageCenter.java | 4 KB | Jul. 21, 2005 |
| ProblemController.java | 3 KB | Jul. 21, 2005 |
| Problems.owl | 1 KB | Jul. 13, 2005 |
| PubCrawl.java | 1 KB | Jul. 19, 2005 |
| ReasonEngine.java | 9 KB | Jul. 21, 2005 |
| RedHatListener.java | 4 KB | Jul. 8, 2005 |
| Self.owl | 1 KB | Jun. 23, 2005 |
| SystemListener.java | 2 KB | Jun. 9, 2005 |
| Task.java | 3 KB | Jul. 21, 2005 |
| TaskItem.java | 2 KB | Jun. 30, 2005 |
| TaskManager.java | 5 KB | Jul. 21, 2005 |
| Task.owl | 2 KB | Jul. 15, 2005 |
| WindowsListener.java | 1 KB | Jun. 9, 2005 |

III. FIELD OF THE INVENTION

This invention relates to an autonomous learning system or network containing artificial intelligence (AI) that allows computers to share learned knowledge with other machines such that errors, problems and potential problems are quickly and efficiently identified and resolved.

IV. BACKGROUND OF THE INVENTION

System or network administrators spend a large amount of their time troubleshooting, identifying and repairing errors, problems and potential problems on the system. These errors are often simple problems like running out of disk space or a hung application, and require simple solutions like deleting unneeded files or restarting a process. Many times these problems are recurring and can be seen on several different machines. This constant troubleshooting and repairing of systems leads to the loss of otherwise productive time on the part of the administrator. There are several systems in the artificial intelligence ("AI") realm which attempt to address these issues by creating a system of self-healing.

Figure 1:
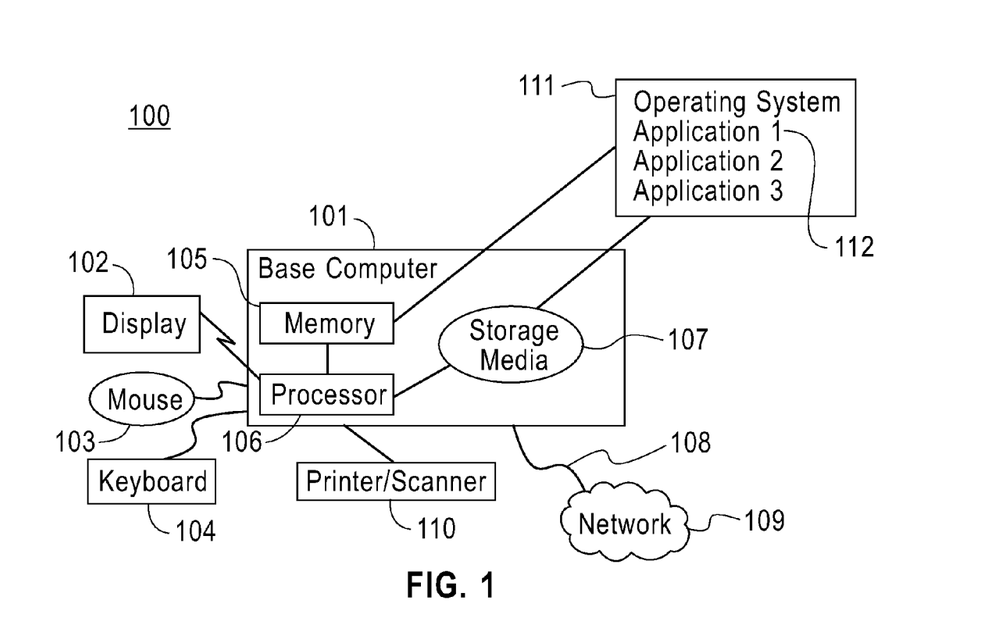
FIG. 1 illustrates a computer.

FIG. 1 depicts the elements that make up a typical computer for use in networked applications. The computer system 100 consists of a base computer 101 which comprises a processor 106, storage media such as a magnetic disk 107 and a high speed volatile main memory 105. An operating system and application programs 111 reside on the storage media 107 and are paged into main memory 105 as needed for computations performed by the processor 106. The base computer 101 may include optional peripheral devices including a video display 102, a printer or scanner 110, a keyboard 104, a pointing device (mouse) 103 and a connection 108 to a network 109. In a client environment, a user interacts with a Graphical User Interface (GUI) by using a keyboard 104 and mouse 103 in conjunction with the display of information on the display 102 under control of an application program (application 1) 112. The client application program 112 then interacts with remote users by way of the network 109.

Figure 2:
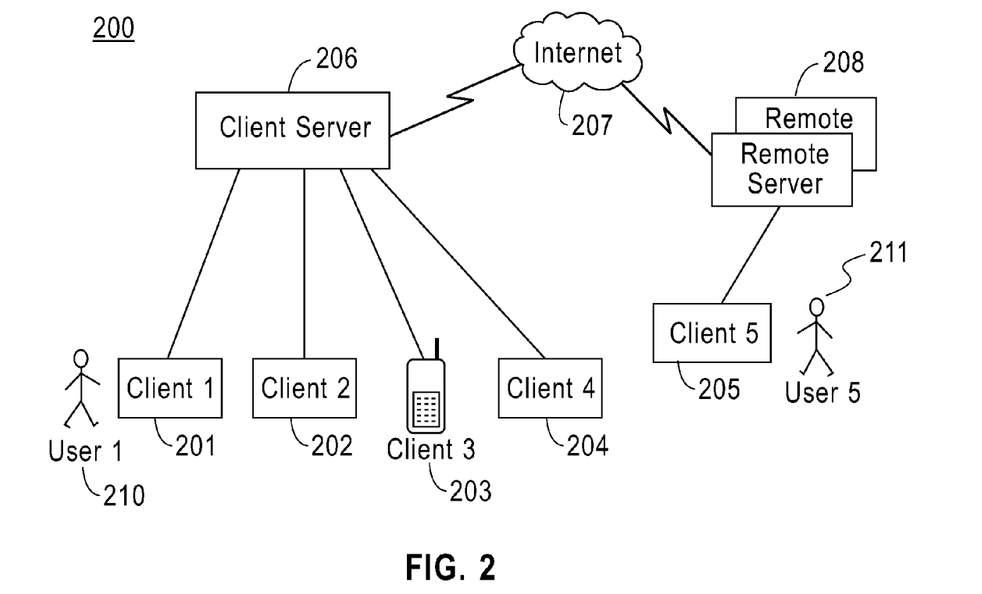
FIG. 2 illustrates a network of computers interconnected via the internet.

In FIG. 2, an example of an Internet system is shown. A user 210 at client 201 uses applications on his system and can interact with clients 2-4, shown at 202-204, by way of a client-server computer 206 or directly. Applications 112 may be provided by each client 201-205 and/or the client server 206 or some remote server 208 by way of the network 207. The user 210 at client 1 can interact with a remote user 5, shown at 211, at client 5, shown at 205, by way of the Internet 207.

V. SUMMARY OF THE INVENTION

The present invention goes beyond a self-contained autonomic learning system. Through the use of inter-server communication over a publish/subscribe (or pub/sub) system it allows systems to share learned knowledge with other systems on the network.

The present invention turns any computer on a network into an autonomic learning agent capable of identifying and analyzing errors, problems and potential problems, deducing possible solutions from a set of known rules, communicating with other systems on the network for additional information regarding potential solutions, and repairing itself based on the solution information gathered. It can also be used for identifying network-related or inter-computer communication problems that could not otherwise be identified from a single agent system.

The system in accordance with an exemplary embodiment of the present invention is comprised of more than one computer connected via a network. Each exemplary computer contains software that identifies it as a unique "agent" on the network. An agent is installed on each computer that is to be part of the distributed AI network in this embodiment. Each exemplary agent contains three (3) major components: a task manager which controls the monitoring of the system or network and triggers alerts when a problem or potential problem is identified; a reason engine which contains the Artificial Intelligence (AI) system used for deducing possible automatable solutions for an identified problem; and a messaging interface which handles communication between agents.

The present invention reduces the amount of time administrators would spend identifying system or network problems by automating the problem-solving process. In addition, it reduces the time an administrator would spend talking to other administrators who had experienced the same problem by allowing the computers themselves to share previously learned knowledge with other machines. Offline, a single agent can still function as an autonomous learning system.

Agents can be added or removed from the system at will without interruption of the overall distributed AI.

Each exemplary agent utilizes a pub/sub system as described in United States Patent Application Publication Number US 2004/20040019637 entitled "INTERACTIVE ONE TO MANY COMMUNICATION IN A COOPERATING COMMUNITY OF USERS" and incorporated herein by reference to communicate with other agents on the network.

VI. BRIEF DESCRIPTION OF THE DRAWINGS

The present invention is described with reference to the accompanying drawings, wherein.

VII. DETAILED DESCRIPTION OF THE DRAWINGS

Figure 3:
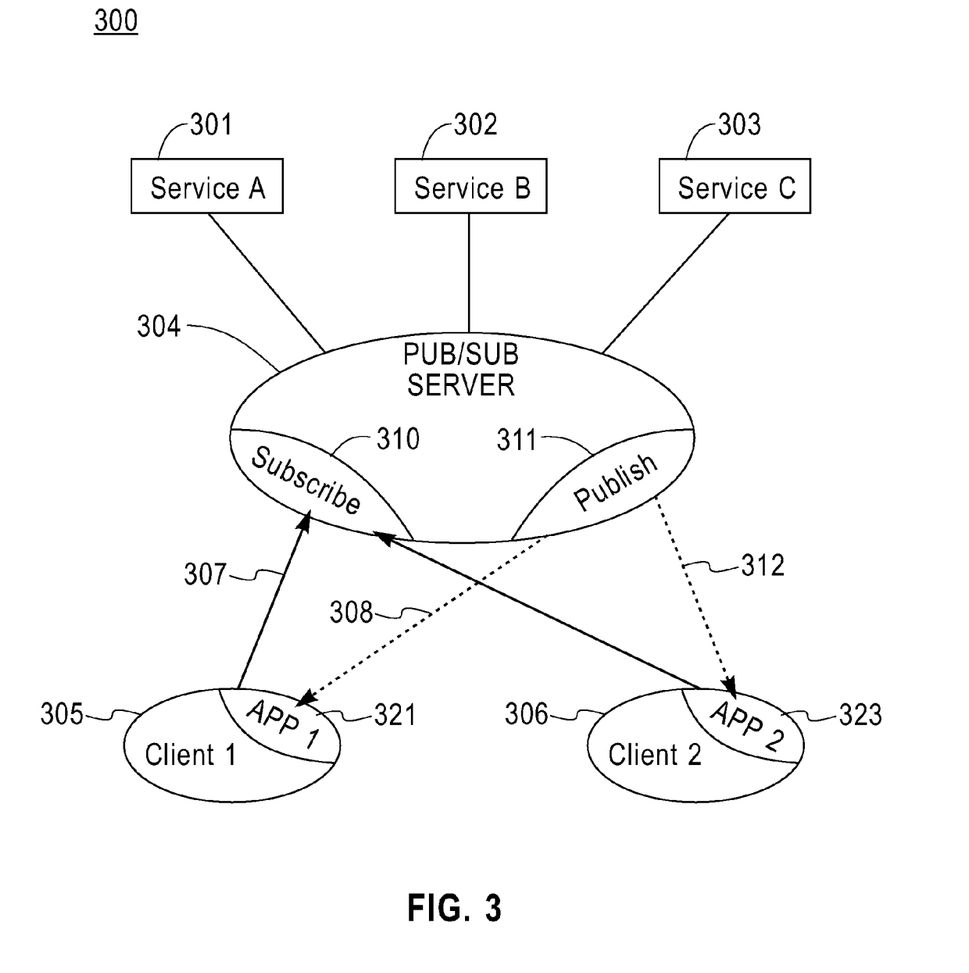
FIG. 3 illustrates a logical depiction of a Pub/Sub implementation that may be used to support the present invention.

FIG. 3 outlines a publish/subscribe (or pub/sub) system that may be utilized to implement the present invention. In FIG. 3, the pub/sub system 300 is made up of a Content Provider application (Service) 301-303, the Client subscribers 305-306, and the Pub/Sub Server 304. Applications may implement one or more of these roles. The content provider 301-303 generates content for distribution through the pub/sub system 300. Content providers 301-303 send structured content to one or more instances of the pub/sub server 304. The client subscriber 305-306 sends subscription requests 307 to an instance of the pub/sub server 304 and, subject to acceptance of a particular subscription request, receives content 308 from the pub/sub server 304. The actual content received will be determined by the subscription and the message selection process.

The pub/sub server 304 acts as both a subscription manager 310 and a content distribution agent 311. Applications implementing the pub/sub server role 304 accept subscription requests 307 from client subscribers 305 and, subject to any applicable authentication or access control policies, accept or reject subscription requests; and distribute content 308 to valid client subscribers 305.

The actual content sent to each client subscriber 305-306 by the pub/sub server 304 will be determined by the subscription process 310 and through the message selection process 311.

Applications implementing some aspect of the pub/sub system may act in different roles in different circumstances. For example, an application implementing the pub/sub server role 304 may itself act as a subscriber, subscribing to and receiving content from another instance of the pub/sub server. Similarly, an application acting in the subscriber role may act as a content producer if the end-user of the application wishes to publish a message to the server.

The pub/sub system provides for communication among applications implementing the application roles. There are two primary communications in the pub/sub system: messages are sent from content providers to pub/sub server; and pub/sub server sends messages to subscribers 308, 312.

Content providers 301-303 may generate messages from any content source, and client subscribers may dispose of messages in any manner they choose. For example, a content provider may simply be a gateway between a raw content source, such as e-mail or web pages, to the pub/sub server. Similarly, a client subscriber 305, 306 may act as a gateway between the pub/sub server and an external server such as NNTP or e-mail.

An exemplary system of the present invention includes more than one computer connected via a network. Each computer contains software which identifies it as a unique "agent" on the network. An agent is installed on each computer that is to be part of the distributed AI network.

Figure 4:
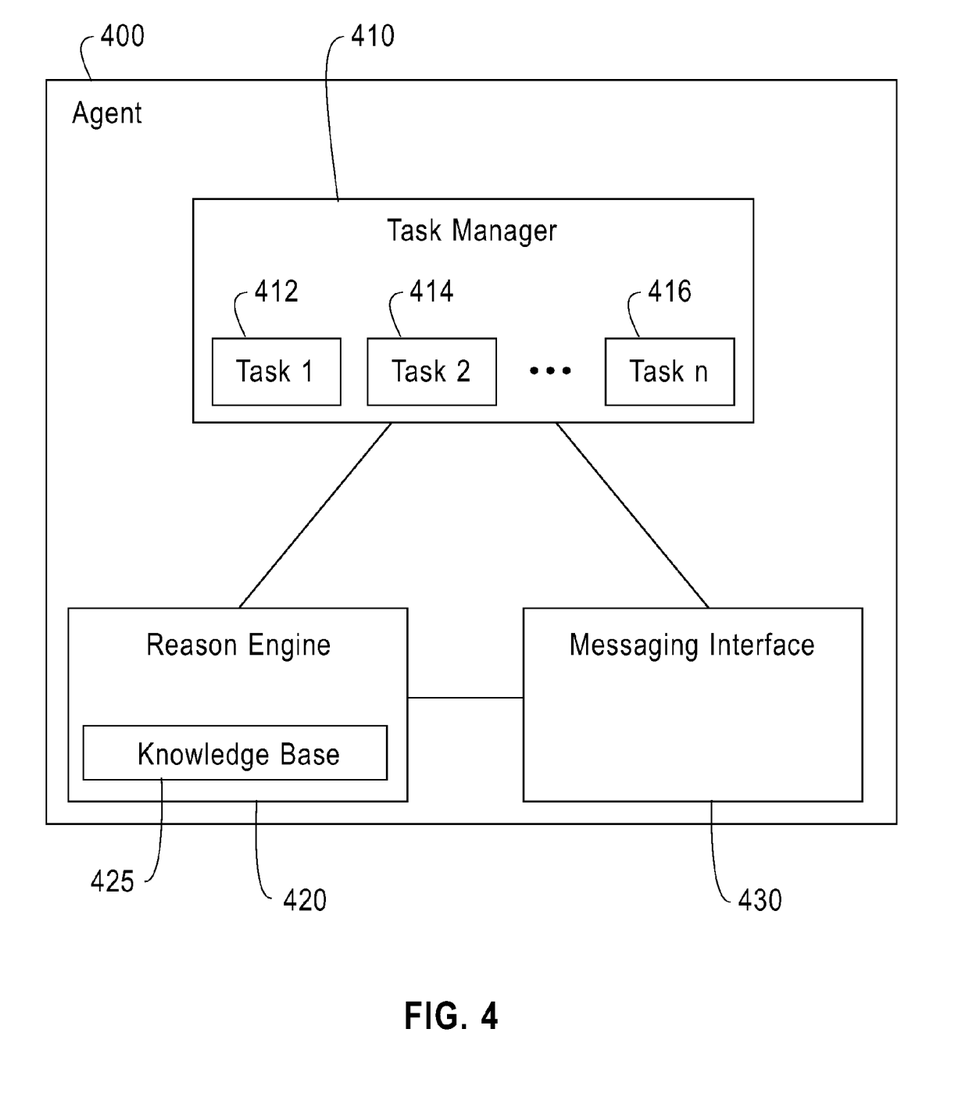
FIG. 4 illustrates an exemplary embodiment of an agent in accordance with the present invention.

Each agent 400, as illustrated in FIG. 4, contains three (3) major components: a task manager 410 which controls the monitoring of the system or network and triggers alerts when a problem or potential problem is identified; a reason engine 420 which contains an Artificial Intelligence (AI) system used for deducing possible automatable solutions for an identified problem; and a messaging interface 430 which handles communication between agents.

The task manager 410 maintains any number of system monitoring tasks (Task 1, Task 2, . . . Task n), shown at task modules 412-416, which produce results used in the determination of a problem status. An agent 400 with a task manager 410 which contains no tasks may still be a useful agent on the network because it can still provide useful information from its reason engine 420 to other agents on the network.

A task module 412-416 is any monitoring system which produces a measurable result. Task modules 412-416 can be of any number and can include a wide range and variety of functions. These functions may include, for example, determining disk usage levels; verifying CPU usage levels; confirming that a particular computer on the network is accepting connections on a particular port. These functions can be predetermined and set by the administrator or automatically set or adjusted by the system based on usage factors.

The reason engine 420 may use any ontology for knowledge interpretation including, for example, the OWL W3C standard, which complies with the RDF standard, which further complies with the XML standard to define an inter-agent language for the communication and logical deduction of information which may lead to an automated solution to a given problem.

Each agent's reason engine 420 maintains a unique knowledge base 425 which contains a predefined core set of rules, called the schema; and all subsequently acquired solutions or knowledge. Solutions are considered "known" if the reason engine can deduce that a problem P has a solution S using the rules defined in the OWL ontology. The knowledge base 425 may be stored in a variety of formats, such as, text files, or a database instance.

The distributed agents 400 communicate with each other over the network by means of the messaging interface 430. The messaging interface 430 uses a pub/sub system as described in United States Patent Application Publication Number US 2004/20040019637 entitled "INTERACTIVE ONE TO MANY COMMUNICATION IN A COOPERATING COMMUNITY OF USERS" to allow an agent 400 to communicate with other agents. For instance, an agent 400 experiencing a problem would ask for help in identifying possible solutions from other agents on the network. Those other agents would then share possible solutions to those problems.

Figure 5:
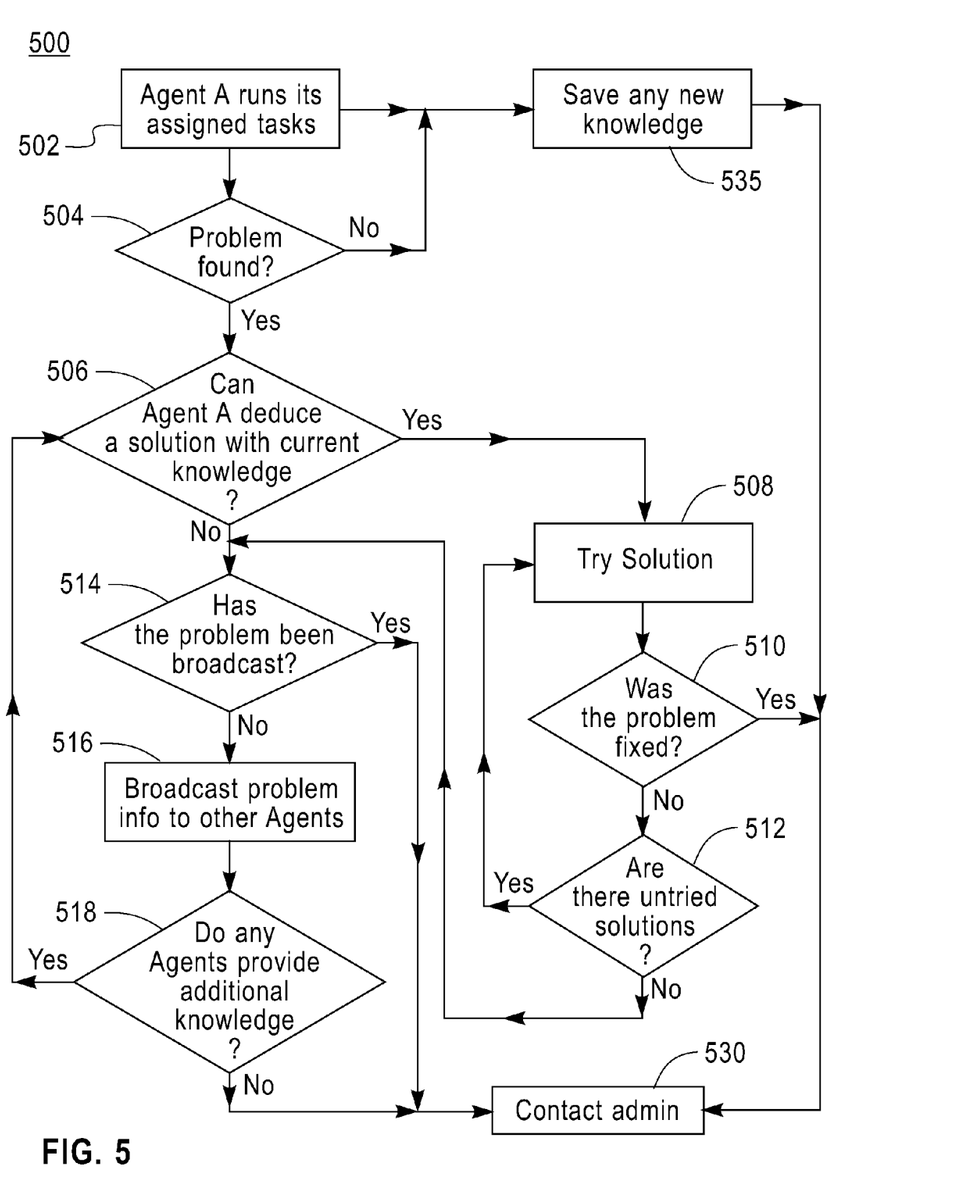
FIG. 5 illustrates a flowchart outlining the process of a running agent in accordance with the present invention.

FIG. 5 outlines the process of how agents 400 find problems and communicate to solve those problems. The process begins at step 502 as a deployed agent runs a set of enabled tasks based on established guidelines. These guidelines are set by the administrator and may be, for instance, based on a set interval of time, upon the occurrence of an event, reaching a threshold level, etc. In step 504, each enabled task determines the existence (or non-existence) of at least one problem state by determining whether one of the problem thresholds has been reached. If no problems are found the process returns to step 502 and repeats the cycle based on the guidelines.

There are two types of problems—"new" and "known". A new problem is a problem that does not exist in the agent's own knowledge base. A known problem is a problem state that already exists in the agent's own knowledge base. When at least one new problem is found, a problem state will be added to the agent's knowledge base indicating the new problem. When a known problem is found, that problem already exists in the agent's own knowledge base and therefore will not be added.

If a new problem is found in step 504, the process proceeds to step 506. In step 506, the agent iterates through each newly detected problem. The process then proceeds to step 508 and attempts to fix the new problem(s) using currently known solution(s). Solutions are considered "known" if the reason engine can deduce that a problem P has a solution S using the rules defined in the OWL ontology.

At step 510, the process determines whether the problem has been resolved. If the problem has been resolved, the process proceeds to contact the administrator, at step 530, and/or save the problem and solution to the knowledge base, at step 535, and awaits the next task, at step 502. If the problem has not been resolved, the process proceeds to step 512 and attempts other solutions known to the agent. If an additional solution known to the agent has not been tried, the process cycles back to step 508 and tries that solution. The cycle of steps 508-512 repeats itself until all solutions known to the agent have been tried.

When all solutions known to the agent have been tried and the problem has still not been resolved, the process proceeds to step 514 and determines whether the problem has been broadcast. If the problem has been broadcast, the process proceeds to step 530 and contacts an administrator. The administrator can then attempt to manually resolve the problem or take other appropriate measures. Any new knowledge is then added to the knowledge base at step 535.

If the problem has not been broadcast, the process proceeds to step 516 where the problem is broadcast to other agents on the network. Once the problem is broadcast, other agents on the network may receive and respond to the broadcast. At step 518, the process determines whether any agents have provided additional knowledge for the problem. If the other agents have not provided additional knowledge, the process proceeds to step 530, the administrator is contacted to resolve the problem and any new knowledge is saved at step 535. If the other agents have provided additional knowledge, the process cycles back to step 506 and proceeds to repeat the cycle of steps 508-512 whereby the agent uses the supplied knowledge to attempt to resolve the problem. This cycle of steps is repeated until the problem is solved or until all possible solutions have been tried.

Once all possible solutions have been tried, the problem has been broadcast, and other agents have no additional knowledge to offer, the process proceeds to step 530 and the administrator is contacted. The administrator may then manually attempt to resolve the problem or attempt other solutions.

When it has been determined that the reason engine, shown at step 506 of the process 500, does not have the knowledge to fix the problem itself it sends out a broadcast containing a description of the problem. Any other agents on the network may receive this broadcast and respond to it. This is an effort to gather additional knowledge regarding the problem whereby the additional knowledge may be used to attempt to resolve the problem.

Figure 6:
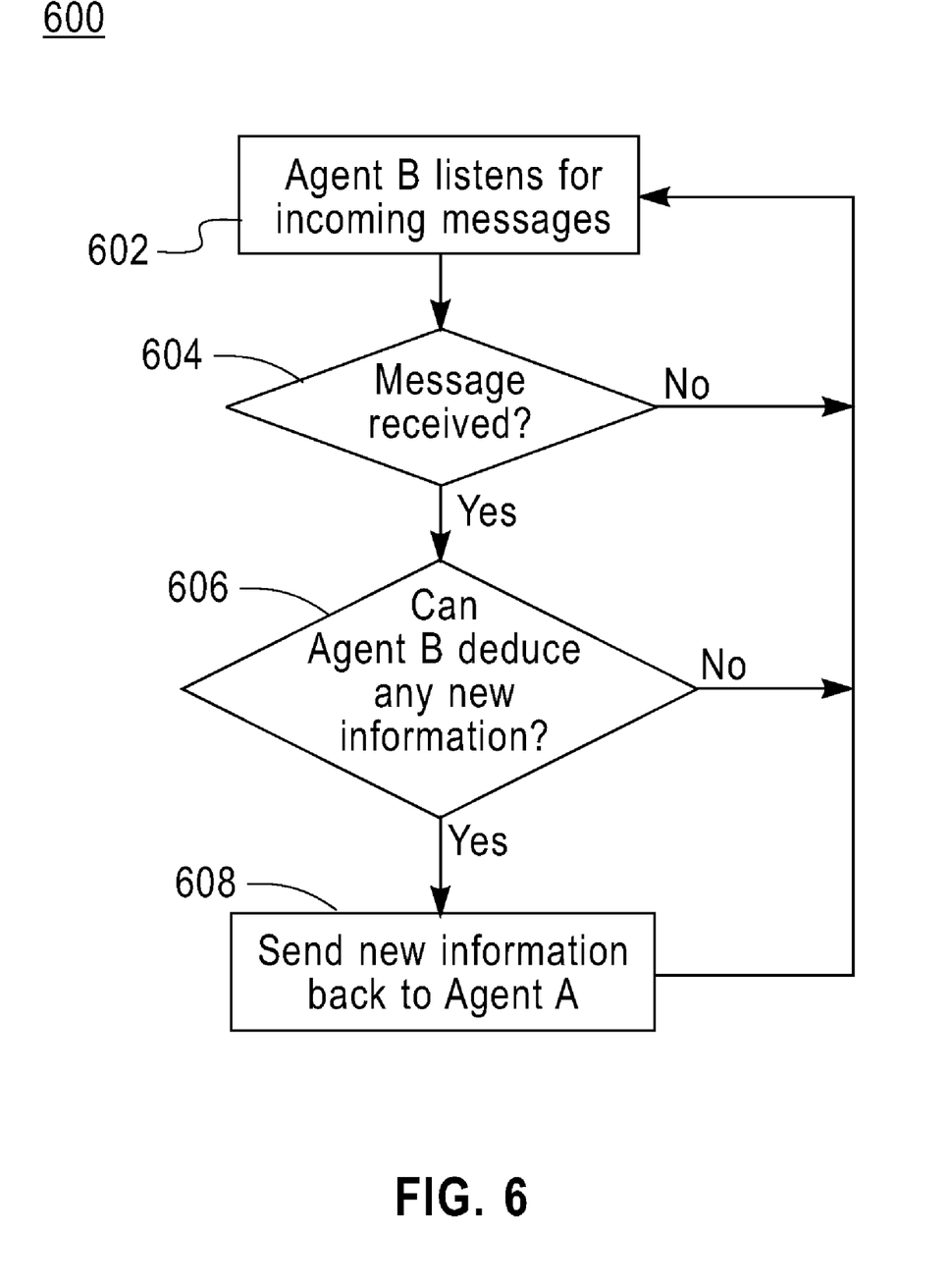
FIG. 6 illustrates a flowchart outlining the process of an agent receiving a broadcast in accordance with the present invention.

FIG. 6 outlines the process 600 according to the present invention wherein an agent receives a broadcast or message requesting a solution for a new problem. The process 600 begins at step 602, wherein agents on the network listen for incoming broadcasts. At step 604, an agent determines whether an incoming broadcast has been received. If no broadcast has been received, the process cycles back to step 602 and continues to listen for incoming broadcasts. When a broadcast is received, the process proceeds to step 606 and the receiving agent determines whether it has any new information regarding the broadcasted problem. The received broadcast contains a problem description that the agent cross-references and compares against its own knowledge base.

If the receiving agent knows of at least one possible solution to the problem, the process proceeds to step 608. At step 608, the receiving agent responds to the original sender with the solution(s). The process then cycles back to step 602 and listens for other incoming broadcasts.

The broadcasting agent, upon receiving a solution from the receiving agent, determines whether the received solution has already been attempted. If the solution has not been attempted, the broadcasting agent tries the solution.

When the problem is fixed, the agent adds the new solution to its own knowledge base for future use and removes the existing problem state. A problem is considered fixed if the task that originally generated the problem is run again and no longer produces the same problem state. If after all available solutions are tried and the problem state still exists, the agent notifies the administrator. This notification can be in any format including email, text message, RSS feed, broadcast, etc.

The system of the current invention provides for great flexibility in the handling and use of new knowledge. Once new knowledge is determined it may be handled in a variety of manners to suit the needs of the network. For example, the new knowledge may automatically propagate throughout the network or it may be manually added by the administrator. It may be added to any single agent or propagated around the network either automatically or as needed. New knowledge may also be filtered to a group of agents based on settings such as location, proximity, knowledge type, etc.

It is also possible to provide a new agent on the network that has no local knowledge and only acquires new knowledge on a real time, as-needed basis. This minimizes the size of the local knowledge base which leads to greater performance.

The system of the present invention in one exemplary embodiment includes a rating system. The rating system rates the solutions an agent learns based on an evaluation of how successful the solution proves to be. Over time the rating system allows an agent that receives multiple solutions for the same problem to make a decision or "judgment" as to which solution of many to select. These judgments may include, for example, the most appropriate solution to try first, which solution(s) can be discarded, determining a security value, etc. For instance, if a solution comes in that has been rated high by several different agents and another solution comes in that has no ratings at all, the solution having the high ratings can be more reliably trusted than the solution having no rating.

The present invention increases efficiency in determining and resolving problems in a computer network environment. It allows agents stored on multiple computers on the network to autonomically determine and resolve problems based on known problems and solutions. It also allows the agents to communicate and share information in a real-time, as-needed fashion, such that solutions known to one agent can be shared with and implemented by other agents. This autonomic sharing and implementation of information makes the invention extremely efficient in resolving problems on the network.

The invention can take the form of an entirely hardware embodiment, an entirely software embodiment or an embodiment containing both hardware and software elements. In at least one exemplary embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As will be appreciated by one of ordinary skill in the art, the present invention may be embodied as a computer implemented method, a programmed computer, a data processing system, a signal, and/or computer program. Accordingly, the present invention may take the form of an entirely hardware embodiment, an entirely software embodiment or an embodiment combining software and hardware aspects. Furthermore, the present invention may take the form of a computer program on a computer-usable storage medium having computer-usable program code embodied in the medium. Any suitable computer readable medium may be utilized including hard disks, CD-ROMs, optical storage devices, carrier signals/waves, or other storage devices.

Computer program code for carrying out operations of the present invention may be written in a variety of computer programming languages. The program code may be executed entirely on at least one computing device, as a stand-alone software package, or it may be executed partly on one computing device and partly on a remote computer. In the latter scenario, the remote computer may be connected directly to the one computing device via a LAN or a WAN (for example, Intranet), or the connection may be made indirectly through an external computer (for example, through the Internet, a secure network, a sneaker net, or some combination of these).

It will be understood that each block of the flowchart illustrations and block diagrams and combinations of those blocks can be implemented by computer program instructions and/or means. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowcharts or block diagrams.

The exemplary embodiments described above may be combined in a variety of ways with each other. Furthermore, the steps and number of the various steps illustrated in the figures may be adjusted from that shown.

It should be noted that the present invention may, however, be embodied in many different forms and should not be construed as limited to the embodiments set forth herein; rather, the embodiments set forth herein are provided so that the disclosure will be thorough and complete, and willfully convey the scope of the invention to those skilled in the art. The accompanying drawings illustrate exemplary embodiments of the invention.

Although the present invention has been described in terms of particular exemplary embodiments, it is not limited to those embodiments. Alternative embodiments, examples, and modifications which would still be encompassed by the invention may be made by those skilled in the art, particularly in light of the foregoing teachings.

Those skilled in the art will appreciate that various adaptations and modifications of the exemplary and alternative embodiments described above can be configured without departing from the scope and spirit of the invention. Therefore, it is to be understood that, within the scope of the appended claims, the invention may be practiced other than as specifically described herein.

VIII. INDUSTRIAL APPLICABILITY

The above-described invention is useful for quickly and efficiently determining and resolving problems within a network in an automated manner. The invention allows agents that reside on individual computers on the network to automatically resolve problems on the computer. It also allows the agents to communicate and share information regarding solutions to problems with other agents on the network such that those agents can also resolve problems. The invention reduces the time required to resolve these problems and assists administrators in more efficiently maintaining the network.

We claim:

1. An autonomic learning system, comprising:
a network containing at least two computers;

an autonomic learning agent stored on at least two of said at least two computers, said autonomic learning agent comprising:
- a task manager including at least one task module, wherein said at least one task module performs at least one system monitoring function;
- a reason engine in communication with said task manager, wherein said reason engine includes
  - an artificial intelligence system that provides ontology based problem analysis, and
  - a database that stores solutions and acquires new knowledge; and
- a messaging interface in communication with said task manager and said reason engine, wherein said messaging interface allows said autonomic learning agent to communicate with other agents on said network.

2. An autonomic learning system according to claim 1, wherein said autonomic learning agent is adapted to:
- identify and analyze problems;
- deduce possible solutions;
- share knowledge with other agents or systems on the network; and
- make repairs based on the deduced solutions and shared knowledge.

3. An autonomic learning system according to claim 1, wherein a first agent sends out a problem message or broadcast to other agents when the first agent experiences a problem that it does not have the appropriate knowledge to solve.

4. An autonomic learning system according to claim 3, wherein other agents receive the problem message or broadcast sent by the first agent and respond by sending any known solutions or knowledge on how to solve the problem.

5. A method of autonomic learning on a network of at least two computers, the at least two computers having an autonomic learning agent stored on at least two of the at least two computers, the method comprising:
- performing at least one system monitoring function,
- identifying and analyzing problems,
- deducing possible solutions from known solutions,
- sending out a problem message or broadcast when an agent experiences a problem that it does not have a solution for,
- sharing knowledge between agents or systems on the network upon request,
- performing repairs to said problems based on at least one of the deduced solutions and shared knowledge, and
- performing ontology based problem analysis, wherein said problem analysis is performed at least in part with stored solutions and newly acquired knowledge.

6. A method of autonomic learning according to claim 5, further comprising receiving a problem message or broadcast from an agent experiencing a problem and responding by sending any known solutions or knowledge on how to solve the problem.

7. A computer program product comprising a computer useable medium including a computer readable program, wherein the computer readable program when executed on a computer causes the computer to:
- perform at least one system monitoring function,
- identify and analyze problems,
- deduce possible solutions,
- send out a problem message or broadcast when an agent experiences a problem that it does not have a solution for,
- share knowledge with other agents or systems on the network,
- make repairs based on the deduced solutions and shared knowledge, and
- perform task management functions.

8. A computer program product according to claim 7, wherein the computer readable program further causes the computer to:
- receive a problem message or broadcast from an agent experiencing a problem and respond by sending any known solutions or knowledge on how to solve the problem.

9. A computer program product according to claim 7, wherein the computer readable program further causes the computer to:
- utilize a reason engine including an artificial intelligence system which provides ontology based problem analysis to perform analysis and reasoning.

10. An autonomic learning system, comprising:
- a network containing at least two computers;
- an autonomic learning agent stored on at least two of said at least two computers, said autonomic learning agent comprising:
  - a task manager including at least one task module, wherein said at least one task module performs at least one system monitoring function;
  - a reason engine in communication with said task manager; and
- a messaging interface in communication with said task manager and said reason engine, wherein said messaging interface allows said autonomic learning agent to communicate with other agents on said network,
- wherein a first agent sends out a problem message or broadcast to other agents when the first agent experiences a problem that it does not have the appropriate knowledge to solve.

11. An autonomic learning system according to claim 10, wherein other agents receive the problem message or broadcast sent by the first agent and respond by sending any known solutions or knowledge on how to solve the problem.

* * * * *